United States Patent [19]
Cox et al.

[11] Patent Number: 5,909,447
[45] Date of Patent: Jun. 1, 1999

[54] CLASS OF LOW CROSS CORRELATION PALINDROMIC SYNCHRONIZATION SEQUENCES FOR TIME TRACKING IN SYNCHRONOUS MULTIPLE ACCESS COMMUNICATION SYSTEMS

[75] Inventors: Timothy F. Cox, Palo Alto, Calif.; Francis D. Natali, Townsend, Wash.

[73] Assignee: Stanford Telecommunications, Inc., Sunnyvale, Calif.

[21] Appl. No.: 08/813,091

[22] Filed: Mar. 7, 1997

Related U.S. Application Data

[63] Continuation-in-part of application No. 08/739,317, Oct. 29, 1996.

[51] Int. Cl.$^6$ ............................................. H04J 3/06
[52] U.S. Cl. ........................... 370/508; 370/515; 370/519
[58] Field of Search ................................ 370/503, 507, 370/508, 509, 514, 515, 519

[56] References Cited

U.S. PATENT DOCUMENTS 5,428,647  6/1995  Rasky et al. ............................. 375/366
5,459,469  10/1995  Schuchman et al. ..................... 342/37

*Primary Examiner*—Melvin Marcelo
*Attorney, Agent, or Firm*—Jim Zegeer, Esq.

[57] ABSTRACT

A star configured multiple access radio communication system wherein a hub station communicates, in time division multiplex mode, with a plurality of remote subscriber stations by a forward link signal path and the remote subscriber stations communicate with the hub on a return link signal path and wherein all received return link signals are time synchronous, and all signals possess the same time division multiplex structure in which a portion of the signal is dedicated to time synchronization. Each remote subscriber station has a synchronization burst sequence generator, each generated burst sequence is constructed such that the time tracking and synchronization process of each return link is relatively unaffected by all other remote stations. At the hub station there is a delay discrimi-nator for each remote subscriber, each delay discriminator includes a first and a second channel. The first channel has a one symbol delay device, a matched filter, and a squaring circuit. The second channel has a matched filter and a squaring circuit. A summing circuit sums the outputs of the squaring circuits, and an output sampler sample the incoming signals at an offset of half a symbol period with respect to the peak of the first matched filter.

3 Claims, 3 Drawing Sheets

—·— FORWARD LINK —·→

—— RETURN LINK ——→

CLASS OF LOW CROSS CORRELATION PALINDROMIC SYNCHRONIZATION SEQUENCES FOR TIME TRACKING IN SYNCHRONOUS MULTIPLE ACCESS COMMUNICATION SYSTEMS

This application is a continuation-in-part of application Ser. No. 08/739,317 filed Oct. 29, 1996 entitled A DELAY-LOCK LOOP FOR TIME TRACKING IN SYNCHRONOUS MULTIPLE ACCESS COMMUNICATION SYSTEMS.

BACKGROUND AND BRIEF DESCRIPTION OF THE INVENTION

The star architecture of the multiple access communications system consists of a hub station in the center of the star and remote stations of which there is one each at the star. It is assumed that a communications path exists by which the hub station transmits information to each of the remote stations and this path is called the forward link. It is assumed that a communications path exists by which an individual remote station transmits information to the hub station and this path is called the return link. A star architecture with K remote stations is shown in FIG. 1.

The object of this invention is to provide apparatus and method for the synchronization of signal timing in a multiple access communications system.

The present invention is part of that multiple access communications system which is configured in a star architecture and for which it is necessary that all return link signals received at the hub station are time synchronous. All signals possess the same time division multiplex structure in which a portion of the signal is dedicated to a time synchronization burst. This invention specifies that burst sequence for each individual signal and provides a time tracking delay-lock loop for each individual signal even though the sync bursts from all of these received signals are coincident in time and frequency. The novelty of this invention is the use of special sync burst sequences in the well known time-gated delay lock loop (Spilker, J.J. DIGITAL COMMUNICATIONS BY SATELLITE, Englewood Cliffs, N.J., 1977, Prentice-Hall, pp. 555–569). These sync burst sequences are specified so that the interferences between coincident signals is minimized for timing offsets up to ±1 chip, which means that the time tracking and synchronization process for each return link is relatively unaffected by all of the others. To implement the time tracking loop a portion of the forward link information capacity is allocated to the signal timing error data which the remote station uses for timing correction. It is assumed that each remote station receives its own timing error data in a robust, uncorrupted manner. A portion of the return link information capacity is allocated to the sync burst which is received by the hub station and processed by the delay discriminator.

SYNC BURST

The sync bursts are specified in sets and generated to possess special properties which provide the desirable characteristics of minimal mutual interference when all of the sync bursts are nearly coincident. Each symbol of the sequence is drawn from the binary alphabet $\{-1,+1\}$. The construction of the set of sync bursts is as follows:

1. The number of symbols in a sync burst sequence is P, where P is even.
2. Denoting the symbols of the $k^{th}$ sync burst sequence as $a_0(k)$, $a_1(k)$, $a_2(k)$, . . . , $a_{p-1}(k)$, then there is a symmetry about the midpoint of the sequence such that $a_i(k)=a_{P-1-i}(k)$ for i=0, 1, . . . , P–1. This means that the P length sequence is completely defined by $a_0(k)$, $a_1(k)$, $a_2(k)$, . . . , $a_{P/2-1}(k)$. This type of sequence is a palindromic sequence.
3. The last symbol of the P/2 length subsequence is the same as the first such that $a_{P/2-1}(k)=a_0(k)$, $a_1(k)$. This means that the P length sequence is fully defined by the P/2–1 length sequence $a_0(k)$, $a_1(k)$, $a_2(k)$, . . . , $a_{P/2-2}(k)$.
4. The circular autocorrelation function of the P/2–1 length sequence is two valued. Specifically, the values are given as:

$$C(\tau) = \sum_{n=0}^{P/2-2} a_n(k)a_{(n+\tau)mod(P/2-1)}(k) = \begin{cases} P/2-1 \text{ for } \tau = 0 \\ -1 \text{ for } \tau = 1, 2, \cdots, P/2-2 \end{cases}$$

5. The P/2–1 length sequence for each synchronization sequence is a circular shift of a basis sequence, $b_0$, $b_1$, $b_2$, . . . ,$b_{P/2-2}$ such that $ai(k)=b_{(i+J(k))mod(P/2-1)}$ for all i=0, 1, . . . , P/2–2 and for a given $J(k)$, $0 \leq J(k) \leq P/2-2$. The set J consists of the circular shift indices for the K remote stations. The basis sequence, b, has a two valued circular autocorrelation function as in Step 4 since all of the P/2–1 length sequences are circular shifts of the basis sequence.
6. The definition of the values in the set J is crucial to the functionality of this invention. To a large degree it is the proper selection of the circular shift indices that provides for minimal interferences between the return link sync bursts. Since the use of a sync burst sequence is in conjunction with a delay discriminator, the operational limitations of the discriminator will dictate the design. As will be described later, this limitation leads to the following rules for selecting the circular shift indices in J.
   Rule 1: The first symbol of each sync burst has the same value, that is, $a_0(m)=a_0(n)$ for all m,n=0,1, 2, . . . ,K–1.
   Rule 2: The minimum absolute difference between all pairs of indices in J is greater than one, that is $|J(m)-J(n)|>1$ for all m,n=0, 1, 2, . . . ,K–1.

DESCRIPTION OF THE DRAWINGS

The above and other objects, advantages and features of the invention will become more apparent when considered with the following specification and accompanying drawings, wherein.

DETAILED DESCRIPTION OF THE INVENTION

The invention is incorporated in a multiple access communication system in which return link paths from the remote stations to the hub are time synchronous.

Figure 2:
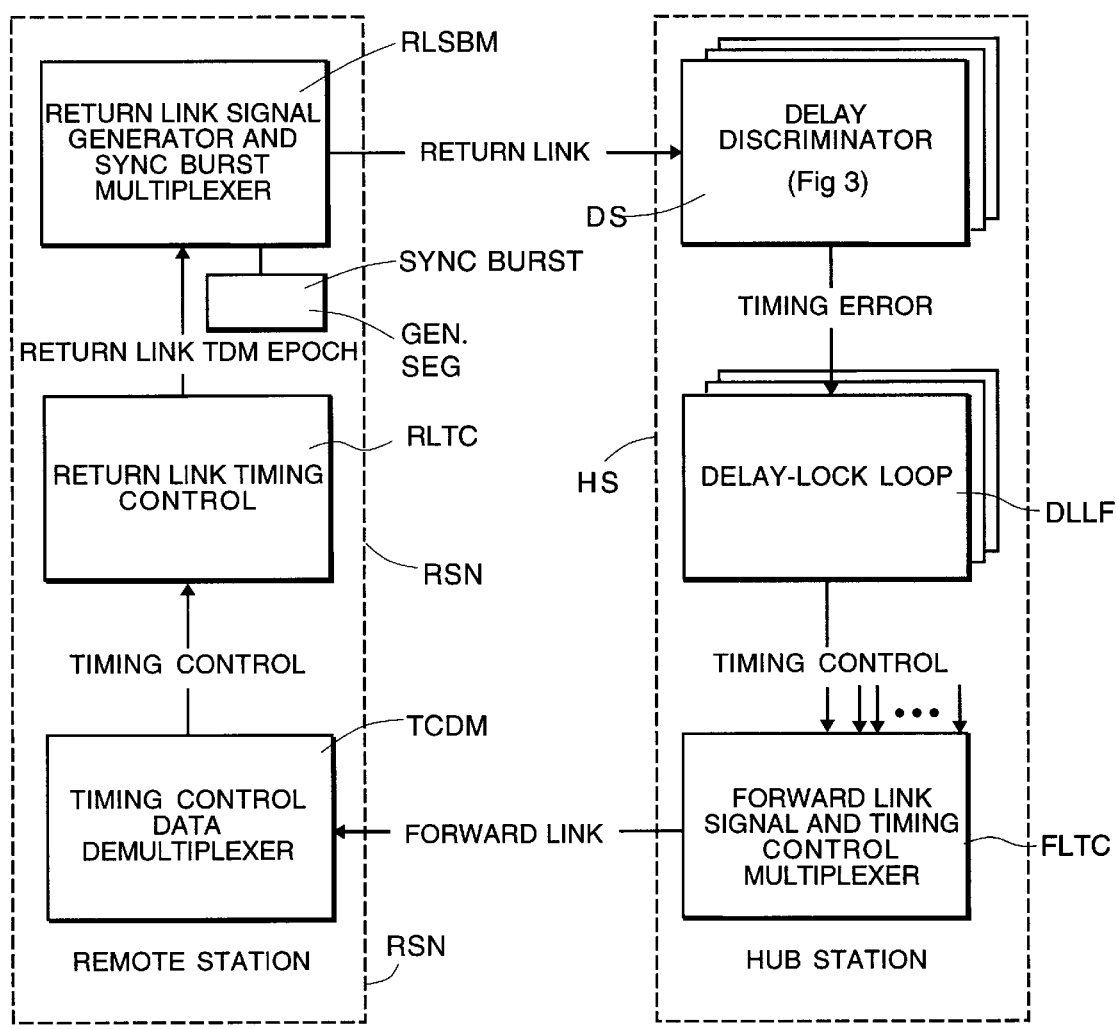
FIG. 2 is a block diagram of the return link time tracking delay-lock loop with processing element allocated to remote and hub stations, incorporating the invention.
Figure 5:
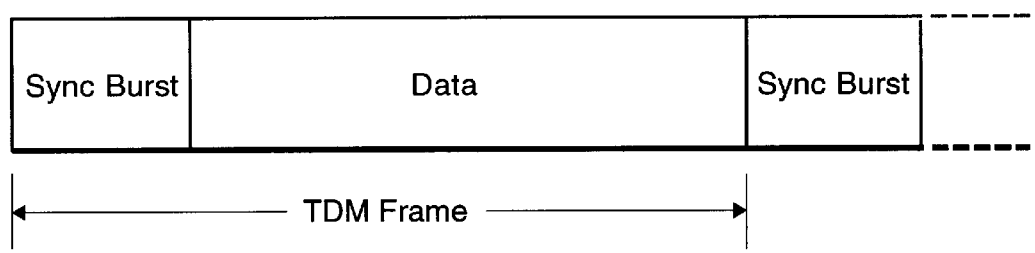
FIG. 5 illustrates the time division multiplexed waveform with sync burst multiplexed with the user terminal data signal.

As shown in FIG. 2, the remote station RS receives forward link signals from the hub station HS which are downconverted, processed and applied to a timing control data demultiplexer TCDM which outputs the timing control signal to return link timing control unit RLTC. Return link timing control RLTC outputs the return link time division multiplex (TDM) epoch to the return link signal generator and sync burst multiplexer RLSBM. The sync burst generator SBG generates unique sync bursts (shown in FIG. 5 in relation to a time division multiplexed waveform showing the sync burst multiplexed with the user terminal data signal) having special properties which provide the desirable characteristics of minimal mutual interference when the sync burst of all remote stations are nearly coincident and, preferably have the qualities specified above in the section entitled "Sync Burst".

The broadcast return link signals from each of the remote stations are received at the hub station HS and processed to delay discriminators DS there being a delay discriminator for each remote station, respectively. The timing error signal is filtered in delay lock loop filter DLLF, each of which outputs a timing control signal. The timing control signals from the respective delay lock loop filters are multiplexed in forward link signal and timing control multiplex FLTCM and outputted on the forward link to all remote stations where they are received and processed as described earlier.

Figure 1:
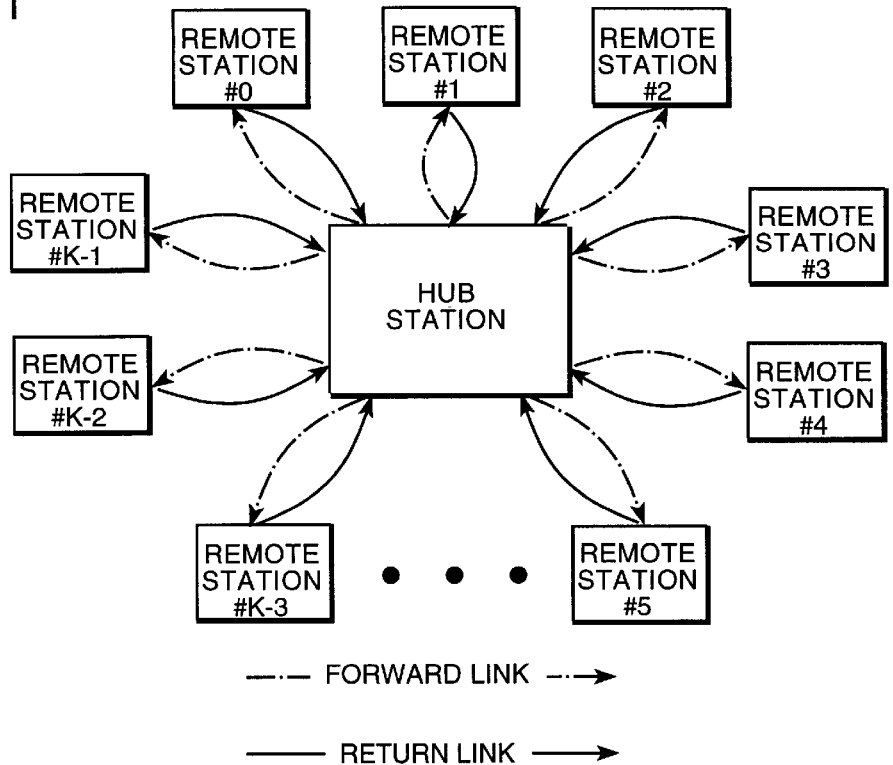
FIG. 1 is a block diagram of a multiple access communications system which is configured in a star architecture, incorporating the invention.
Figure 3:
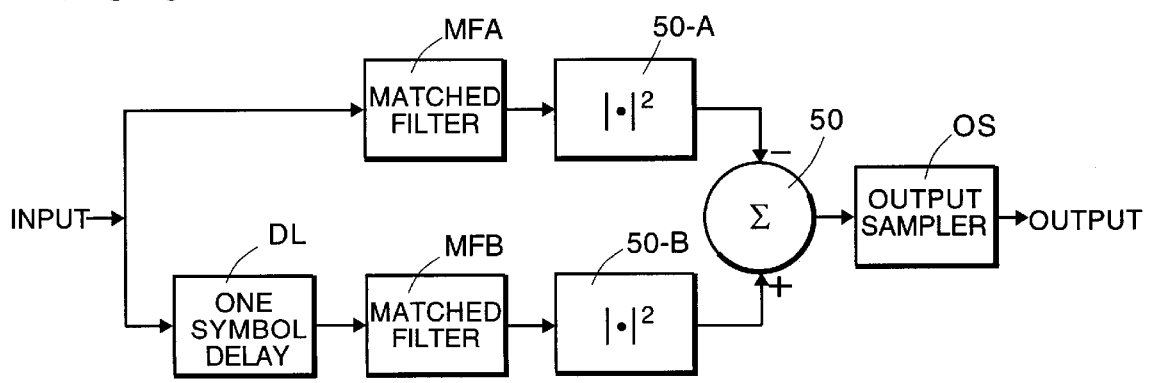
FIG. 3 is a block diagram of the delay discriminator.
Figure 4:
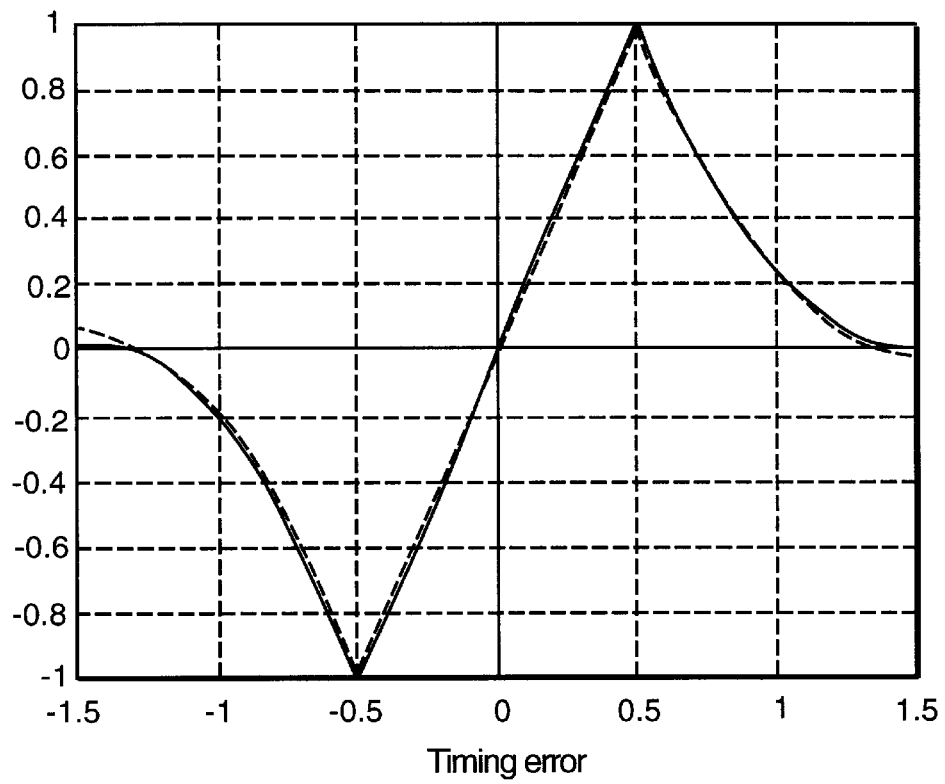
FIG. 4 is a graph illustrating the timing error signal at the output of the delay discriminator shown in FIG. 3.

The novel features of this invention can be seen most readily by describing the delay discriminator process which is illustrated in FIG. 3. This includes a delay element DL (one symbol), two matched filters MFA, MFB, two squaring operators SO-A, SO-B, a summation operator SO and an output sampler OS. As indicated in FIG. 2, the delay discriminator process is duplicated for each remote station in the star architecture, but the coefficients of the digital matched filters are distinct for each remote station since these coefficient values are based on the unique sync burst sequence associated with that remote station. The output sampler samples the incoming signal at an offset of half a symbol period with respect to the peak of the first matched filter output. The timing error signal at the output of the delay discriminator as a function of the return link timing offset for a simple example with K=3 remote stations is shown in FIG. 4. The solid line represents the delay discriminator output with no interference present, and the dashed line shows the degradation in output due to interference from the two other remote stations. Note that the presence of additional users have almost no effect on the discriminator characteristic due to the low cross-correlation of these unique sequences.

There are several types of binary sequences that have the preferred two-valued autocorrelation function. If P is a power of 2, then one of the most obvious choices is the m-sequence or maximal length shift register sequence (Golomb, Solomon W., SHIFT REGISTER SEQUENCES, REVISED EDITION, Laguna Hills, Calif., 1982, Aegean Park Press). In the event that P is not a power of 2 then an m-sequence cannot be used as a basis sequence without modification. Other sequences which have the preferred two-valued autocorrelation function but do not have a length of the form $2^n$ can be used as basis sequences. Such sequences include Legendre (quadratic residue) sequences and twin prime sequences, for example, although the number of elements in the full set J may not be as large as that of the m-sequences. Since the number of sync burst sequences required by a multiple access communications system may be less than the number of elements in J, then any subset of J can be used.

While the invention has been shown and described with reference to a preferred embodiment, it will be appreciated by those skilled in the art that other embodiments, adaptations and modifications of the invention will be readily apparent.

What is claimed is:

1. In a star configured multiple access radio communication system wherein a hub station communicates, in time division multiplex mode, with a plurality of remote subscriber stations by means of a forward link signal path and the remote subscriber stations communicate with the hub on a return link signal path and wherein all received return link signals are time synchronous, and all signals possess the same time division multiplex structure in which a portion of the signal is dedicated to time synchronization, the improvement comprising:

at each remote subscriber station, a synchronization burst sequence generator, each burst sequence generator assuming that the time tracking and synchronization process of each return link is relatively unaffected by all other remote stations, due to the nature of the synchronization burst sequences, and at said hub station a delay discriminator for each remote subscriber, each said delay discriminator including a first and a second channel, said first channel having a one symbol delay means, a matched filter, and a squaring circuit, said second channel having a matched filter and a squaring circuit, means summing the outputs of said squaring circuits, and an output sampler for sampling the incoming signals at an offset of half a symbol period with respect to the peak of said first matched filter.

2. In a star configured multiple access radio communication system wherein a hub station communicates, in time division multiplex mode, with a plurality of remote subscriber stations by means of a forward link signal path and each said remote subscriber station communicates with said hub station on a respective return link signal path and wherein all received return link signals are time synchronous, and all signals possess the same time division multiplex structure in which a synchronization burst portion of the signal is dedicated to the time synchronization, the improvement comprising:

at each remote subscriber station, a synchronization burst sequence generator, each burst sequence generator generating a palindromic synchronization burst sequence, and at said hub station a delay discriminator for each remote subscriber.

3. The system of claim 2 wherein each said delay discriminator includes a first and a second channel, said first channel having a one symbol delay means, a matched filter, and a squaring circuit, said second channel having a matched filter and a squaring circuit, means summing the outputs of said squaring circuits, and an output sampler for sampling the incoming signals at an offset of half a symbol period with respect to the peak of said first matched filter.

* * * * *